United States Patent [19]

Enoki

[11] Patent Number: 4,991,027
[45] Date of Patent: Feb. 5, 1991

[54] CIRCUIT FOR DETECTING A VIDEO MODE
[75] Inventor: Hajime Enoki, Tokyo, Japan
[73] Assignee: Sony Corporation, Tokyo, Japan
[21] Appl. No.: 324,758
[22] Filed: Mar. 17, 1989
[30] Foreign Application Priority Data Mar. 29, 1988 [JP] Japan .................. 63-075517

[51] Int. Cl.$^5$ .......................... H04M 9/491
[52] U.S. Cl. .................. 358/330; 358/310; 360/27; 369/48
[58] Field of Search ............ 360/27, 29; 358/330, 358/310, 340, 39, 336

[56] References Cited
U.S. PATENT DOCUMENTS 4,642,704 2/1987 Doutsubo .................. 360/27
4,686,585 8/1987 Sato ....................... 360/27

Primary Examiner—Aristotelis M. Psitos
Assistant Examiner—Huy Nguyen
Attorney, Agent, or Firm—Alvin Sinderbrand

[57] ABSTRACT

The detection of whether an input FM signal, such as a reproduced signal, which includes particular frequency components representing predetermined information, was recorded in a first or second mode, with the modes having different frequency bands. A first output signal is produced when a particular frequency component in one of the frequency bands is detected and a second output signal is produced when a different frequency component, approximately equal to the difference between twice a predetermined frequency included in the other of the frequency bands and the particular frequency in the one frequency band, is detected. A mode identifying signal indicative of the frequency band occupied by the FM signal is produced in response to the first and second output signals.

29 Claims, 8 Drawing Sheets

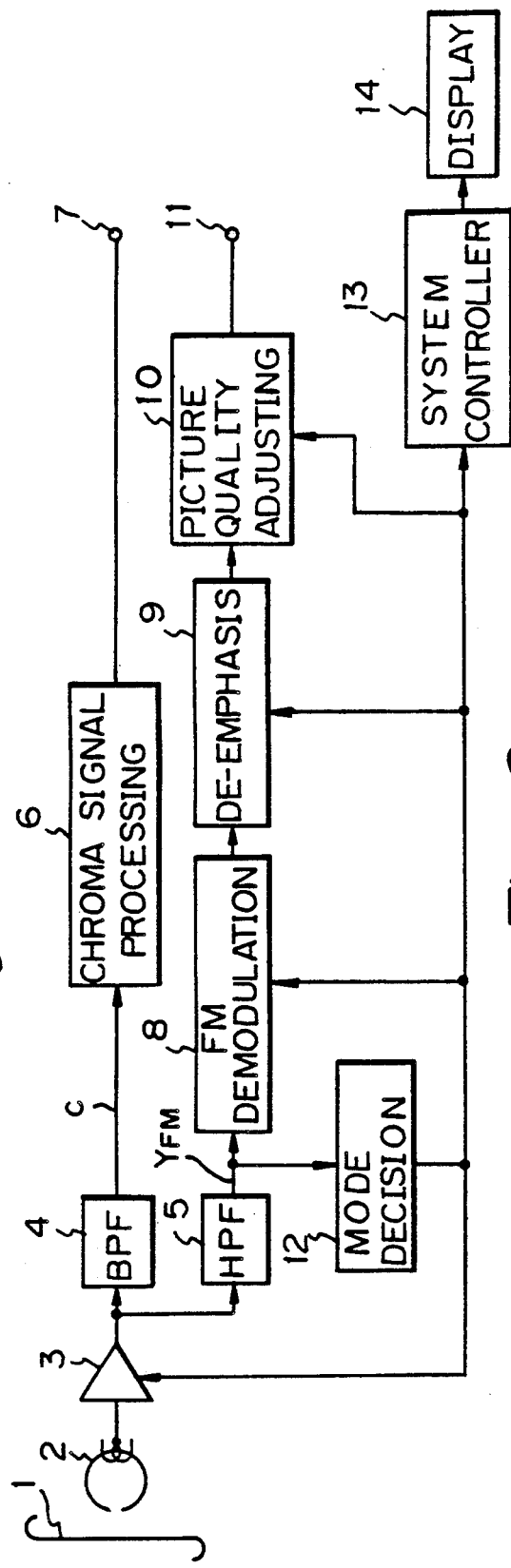
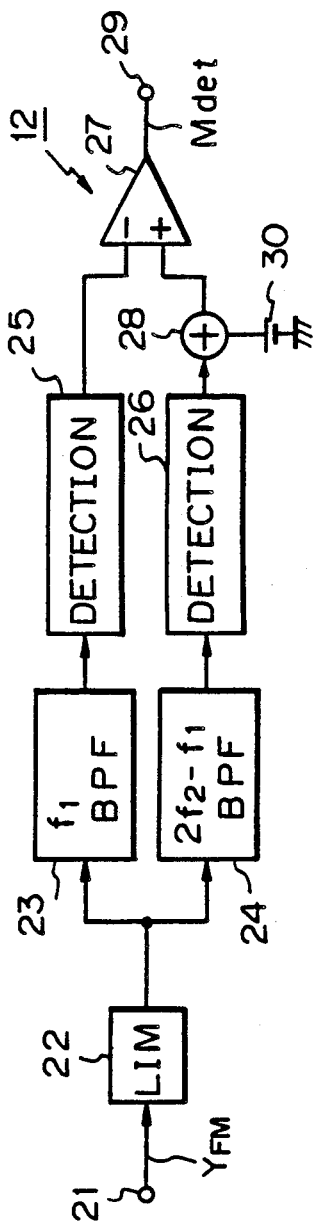
Fig. 5
Fig. 6

A MODULATION WITH 0.5 MHz SINE WAVE

B MODULATION WITH 1 MHz SINE WAVE

C MODULATION WITH 1.5 MHz SINE WAVE

D MODULATION WITH 2 MHz SINE WAVE

E MODULATION WITH 2.5 MHz SINE WAVE

F MODULATION WITH 3 MHz SINE WAVE $f_1$ 4.2 MHz

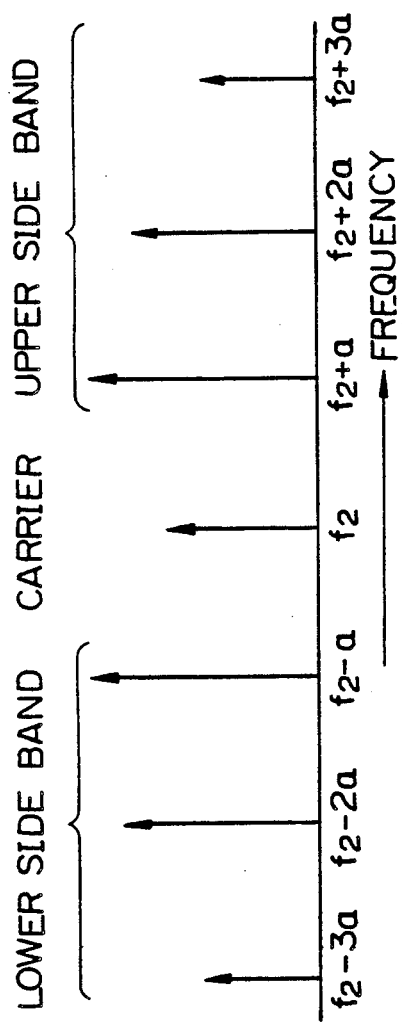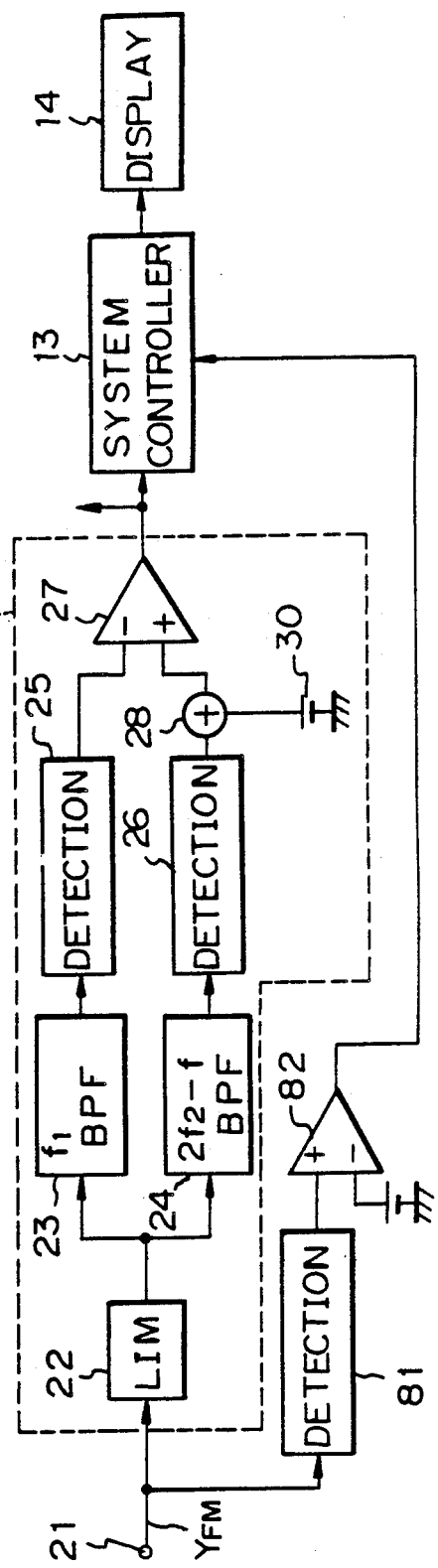

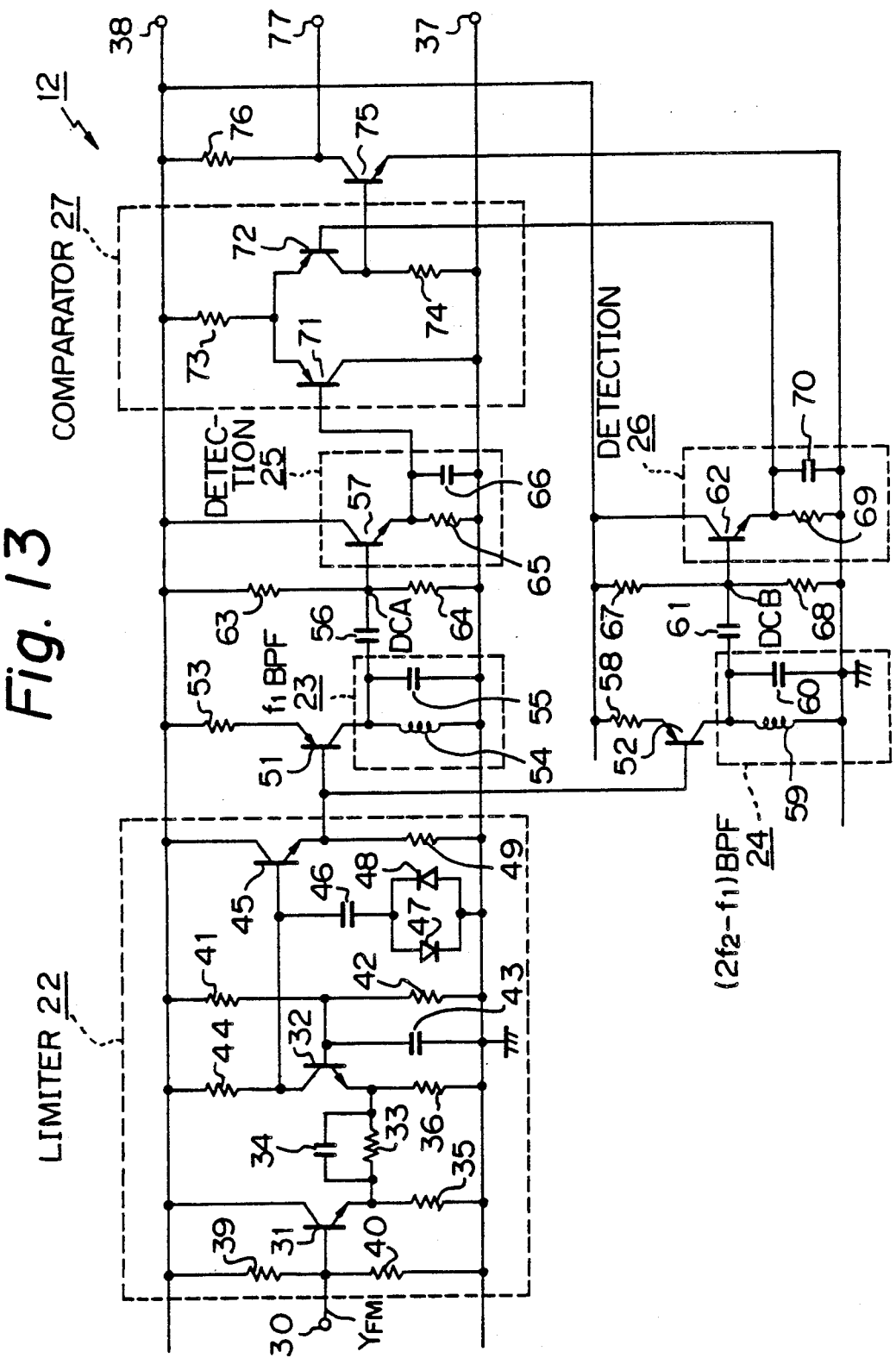

CIRCUIT FOR DETECTING A VIDEO MODE

BACKGROUND OF THE INVENTION

1. Field of the Invention

This invention relates to a mode decision circuit for detecting the mode used in producing an FM signal and, more particularly, to a method and apparatus for detecting whether the FM signal, which may be reproduced from a record medium, was recorded in a first mode occupying a first frequency band or a second mode occupying a second, different frequency band. Although this invention admits of a broad range of applications, it will be described in the environment of a video tape recorder wherein at least one component of the recorded video signal may be recorded in one or another frequency band.

2. Description of the Prior Art

In a typical video tape recorder (VTR), a composite video signal normally is recorded with a chrominance component whose original frequency is converted to a relatively low frequency region and with a luminance component that is frequency modulated. Video signal levels in the luminance component thus are represented by a range of frequency modulations. For example, a maximum, or peak white video level may be represented by a maximum frequency and the amplitude of the usual horizontal synchronizing signal, known as the sync tip level, is represented by a minimum frequency. The remaining video picture information is represented by frequencies within this range.

It is appreciated that improvements in horizontal resolution and picture quality can be achieved by broadening the range of minimum to maximum frequencies that the FM luminance signal may occupy. Accordingly, it has been proposed to use a carrier frequency higher than that used heretofore for FM luminance signal recording and to enlarge the frequency range, or deviation, used to represent video picture information in the luminance component. This can best be appreciated by recognizing that in a typical recording operation in the so-called 8 mm format, the carrier frequency of the FM luminance signal varies from a low of 4.2 MHz to represent the sync tip level to a high of 5.4 MHz to represent the white peak level. Improvement in picture quality is expected if this FM range is broadened and shifted such that the sync tip level is represented by, for example, 5.7 MHz and the white peak level is represented by, for example, 7.7 MHz. This latter recording range of the FM luminance signal is referred to herein as the "high band" mode of recording, whereas the aforementioned range of 4.2 MHz to 5.4 MHz is referred to as the "low band" mode of recording.

It is expected that some VTR's have the capability of recording a video signal (specifically, the FM luminance signal) in either the high band or the low band. Of course, whichever band is selected for recording also is selected for a playback operation. However, it may turn out that a video tape is recorded on another VTR; and a user may not be readily aware of the particular recording mode that was used. Nevertheless, for proper video signal reproduction, the VTR used to reproduce the previously recorded signals should be matched to the VTR which recorded those signals, and thus, it is desirable to provide some means for selecting a high band or a low band reproducing mode. For example, the operating characteristics of the usual FM demodulator, low pass filter, playback amplifier, or deemphasis circuit should be selected to accommodate either a high band or a low band FM luminance signal. While a manual mode change-over switch might satisfy this objective, it often is preferred to provide mode selection automatically and not rely upon accurate selection by a user of the VTR. Automatic band selection is particularly advantageous when a video tape has several programs recorded thereon, some of which having been recorded in the low band mode and others having been recorded in the high band mode.

One proposal for automatically detecting whether the reproduced FM luminance signal was recorded in the high band mode or in the low band mode is comprised of a band pass filter tuned to a particular frequency component normally included in a low band FM luminance signal. For example, the filter may be tuned to the particular frequency which represents the sync tip level (for example, a frequency approximately equal to 4.2 MHz) if the FM luminance signal is recorded in the low band mode. If this particular frequency is detected, a mode identifying signal indicative of the low band mode is produced. Conversely, if this particularly frequency is not detected, as when the FM luminance signal was recorded in the high band mode, the mode identifying signal is correspondingly indicative of that fact.

Another automatic mode detecting circuit which has been proposed heretofore includes two band pass filters: one tuned to the frequency included in the low band mode which represents the sync tip level and the other tuned to the frequency in the high band mode which represents the sync tip level. For example, the low band sync tip frequency may be approximately equal to 4.2 MHz and the high band sync tip frequency may be approximately equal to 5.7 MHz. A low or high band indication is produced as a function of which filter produces an output signal. To improve reliability, the outputs of these filters are compared to each other, resulting in a mode identifying signal of, for example, high or low amplitude depending upon which filter output signal is greater.

The aforementioned proposals suffer from the drawback of erroneous mode detection which may be caused by side band components passed by the low band filter. For example, if the FM luminance signal is recorded in the high band mode, the lower side band component of that signal representing video signal information may be of a frequency sufficiently close to the frequency to which the low band filter is tuned as to be passed by that filter. As a result, the low band filter produces an output signal when, in fact, the FM luminance signal occupies the high band. Accordingly, the mode detecting circuit produces an erroneous indication that the FM luminance signal had been recorded in the low band mode when, in fact, it occupies the high band. This erroneous indication may be produced even when the improved embodiment which compares the outputs of the low band and high band filters is used. In that case, the low band filter output derived from the lower side band of the FM luminance signal may exhibit a greater amplitude than the high band output which represents the sync tip level.

In an attempt to prevent the aforementioned erroneous mode identification, it has been further suggested that the FM luminance signal be supplied to the mode detecting circuit only during the interval that the synchronizing signal is present. According to this further suggestion, a gate circuit is enabled by a gate pulse which coincides in time with the synchronizing signal interval. Hence, the gate circuit is opened only when the synchronizing signal is present and, thus, the lower side band component of other useful video information (i.e. non-synchronizing information) is inhibited from reaching the low band filter when the FM luminance signal occupies the high band.

However, the proposed use of a gate circuit suffers from the disadvantage of relying upon the demodulated FM luminance signal to provide the synchronizing signal from which the gate pulse is derived. If the FM demodulator or other FM processing circuits are not properly adjusted to match the particular mode in which the FM luminance signal had been recorded, the FM signal will not be demodulated properly and, thus, a correct gate pulse will not be produced. For example, if the FM processing circuits are adjusted to match the high band mode, but the reproduced FM luminance signal actually occupies the low band mode, the low band FM signal will not be properly demodulated. This means that if the recording mode has not yet been determined, or if its initial selection is incorrect, proper FM demodulation may not be achieved and, thus, the input gate circuit might not operate properly.

OBJECTS AND SUMMARY OF THE INVENTION

Accordingly, it is an object of the present invention to provide a mode detecting circuit which operates correctly and which avoids the aforenoted deficiencies, disadvantages and drawbacks of previous proposals.

Another object of this invention is to provide a method and apparatus for detecting the frequency band in which an FM signal is recorded.

A further object of this invention is to detect whether an FM luminance signal is recorded in a high frequency band or low frequency band, without erroneous detection that might otherwise be attributed to side band components.

An additional object of this invention is to detect and correctly display an indication of whether a reproduced FM signal is recorded in a high frequency band or a low frequency band.

Yet another object of this invention is to provide an improved mode detecting circuit for detecting the particular mode in which an FM luminance signal had been recorded and for controlling FM processing circuits to match that mode and, thus, correctly recover reproduced luminance information.

Various other objects, advantages and features of the present invention will become readily apparent from the ensuing detailed description, and the novel features will be particularly pointed out in the appended claims.

In accordance with this invention, apparatus is provided for detecting whether a reproduced FM signal, which contains particular frequency components to represent predetermined information, was recorded in a first or second mode having respectively different frequency bands with different carrier frequencies. The reproduced FM signal is applied to two detectors, one for producing a first output signal when the particular frequency component in one frequency band is detected and the other for producing a second output signal when a different frequency component approximately equal to the difference between twice a predetermined frequency included in the other frequency band and the particular frequency in the one frequency band is detected. A signal sensor coupled to the two detectors responds to the two output signals for producing a mode identifying signal indicative of the mode in which the reproduced FM signal was recorded.

In a preferred embodiment, the reproduced FM signal is a video signal, and particularly the FM luminance component thereof. In this embodiment, the predetermined information represented by particular frequency components comprises a synchronizing signal whose amplitude, or sync tip level, is represented by a first particular frequency in one band and a second particular frequency in the other. Also in this embodiment, the predetermined frequency included in the other frequency band is representative of a predetermined video signal level, such as an approximate average level of video picture information. Preferably, this approximate average level is a 50% white level.

As a feature of this invention, the two detectors are comprised of respective band pass filters, each tuned to a different center frequency. As an aspect of this feature, the first band pass filter is tuned to a frequency $f_1$ approximately equal to the frequency representing the sync tip level in one frequency band; and the other band pass filter is tuned to a frequency $(2f_2 - f_1)$, where $f_2$ is equal to the frequency representing an approximately average level of video picture information in the other frequency band.

As another aspect of this invention, a lower side band component included in the upper frequency band may be passed by the band pass filter tuned to frequency $f_1$, but is accompanied by an upper side band component passed by the band pass filter tuned to the frequency $(2f_2 - f_1)$.

As an alternative, $f_1$ may be the frequency representing the sync tip level of the higher frequency band, and an upper side band component of the lower frequency band may be passed by the filter tuned to frequency $f_1$ but is accompanied by the lower side band component passed by the other band pass filter.

As yet another feature of this invention, the signal sensor includes a level adjuster for increasing the level of the output signal produced by one of the detectors relative to the level of the output signal produced by the other. The level adjusted output signals are compared to produce the mode identifying signal.

As an aspect of this feature, the level adjuster comprises a d.c. offset circuit for providing a d.c. offset to the output signal produced by one of the detectors. Preferably, this d.c. offset is a positive value and is added to the output signal produced by the filter tuned to the frequency $(2f_2 - f_1)$.

In accordance with a still further feature of this invention, a display is coupled to the signal sensor and is responsive to the mode identifying signal to display an indication of the mode in which the reproduced FM signal was recorded. Preferably, the display is inhibited in the absence of an input FM signal.

The preferred application of the present invention is with video signal reproducing apparatus which recovers an FM luminance signal and then demodulates and processes that signal. In this environment, the mode identifying signal is used to adjust the operation of the FM demodulator so as to match the demodulator to the frequency band occupied by the FM luminance signal.

As yet another feature of this invention, a first mode indication is provided when the filter tuned to frequency $f_1$ produces an output signal in the absence of an output signal from the other filter; and a second mode indication is provided when the filter tuned to the frequency ($2f_2 - f_1$) produces an output signal regardless of whether an output signal also is present from the other filter.

BRIEF DESCRIPTION OF THE DRAWINGS

The following detailed description, given by way of example, will best be understood in conjunction with the accompanying drawings in which:

FIG. 5 is a block diagram of the reproducing circuits used in a VTR with which the present invention finds ready application;

FIG. 6 is a block diagram of one embodiment of the present invention;

FIG. 11 is a frequency spectrum diagram which is helpful in understanding the present invention;

FIG. 12 is a block diagram of another embodiment of the present invention; and

FIG. 13 is a schematic diagram of the embodiment shown in FIG. 6.

DETAILED DESCRIPTION OF PREFERRED EMBODIMENTS

Figure 1:
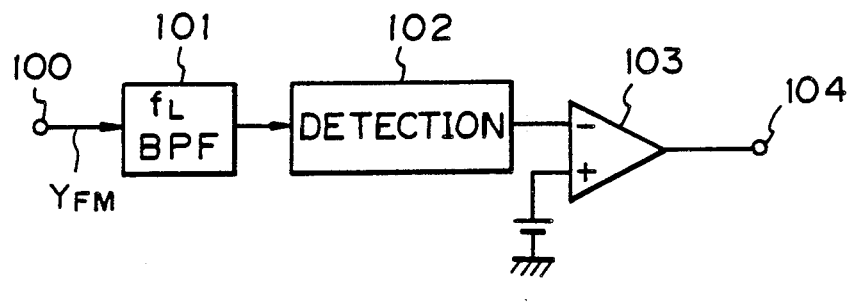
FIG. 1 is a block diagram of a previously proposed mode detecting circuit.

A better appreciation of the improvements attained by the present invention will be realized first by referring to previous proposals of high band and low band detecting circuits of the type discussed in the background portion of this specification. One example of a prior proposal is illustrated in FIG. 1. This illustrated circuit is adapted to detect the presence of a particular frequency component in an FM signal when that signal occupies a selected frequency band. For example, and for the environment of an FM luminance signal that may be recorded in a high or low frequency band, the circuit is adapted to detected when the FM luminance signal contains a frequency component representing the sync tip level when that FM luminance component is recorded in the low frequency band. As illustrated, the FM luminance signal $Y_{FM}$ is supplied to a band pass filter 101 tuned to the frequency $f_L$, where $f_L$ represents the sync tip level. The illustrated circuit proceeds on the basis that when the FM luminance signal occupies its high frequency band, the lowest frequency component included therein exceeds $f_L$ and, thus, no output signal is produced by the band pass filter. A signal detector 102 detects the output of band pass filter 101 and may be thought of as a smoothing, buffer circuit. During normal operation, an output signal is produced by detector 102 substantially only when the frequency representing the sync tip level is received; and this frequency normally is received only when the FM luminance signal occupies its low frequency band. The output signal produced by detector 102 is compared to a threshold level by comparator 103. If this output signal exceeds the threshold level, a low or negative voltage level is supplied to output terminal 104 by the comparator.

Thus, in the mode detector circuit shown in FIG. 1; a mode identifying signal of high or positive voltage level is produced at output terminal 104 when the FM luminance signal supplied to input terminal 100 occupies a high frequency band; and a mode identifying signal of low or negative voltage is produced when the FM luminance signal occupies its low band.

Figure 2:
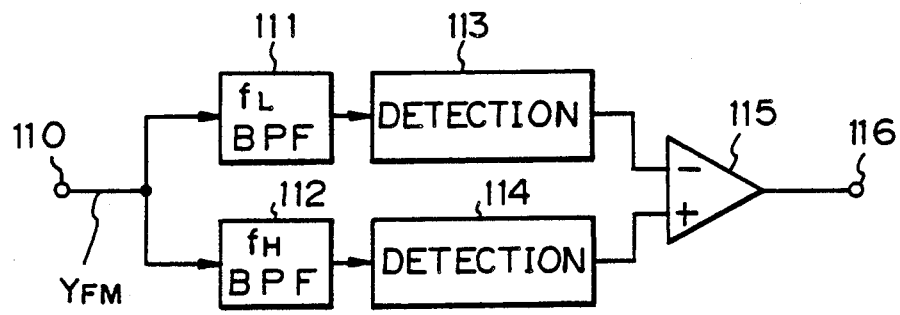
FIG. 2 is a block diagram of another previously proposed mode detecting circuit.

FIG. 2 illustrates another example of a previously proposed mode detecting circuit. This circuit includes parallel-connected low band and high band detectors supplied in common with FM luminance signal $Y_{FM}$. The low band detector is comprised of band pass filter 111 and signal detector 113, similar to band pass filter 101 and detector 102 shown in FIG. 1. Thus, detector 113 produces an output signal when filter 111 detects the frequency component normally used to represent the sync tip level when the FM luminance signal occupies its low frequency band.

Band pass filter 112 is tuned to a frequency $f_H$ normally used to represent the sync tip level when FM luminance signal $Y_{FM}$ occupies its high frequency band. Signal detector 114 may be similar to detector 113 and, thus, produces an output signal when the FM luminance signal includes the high band sync tip frequency $f_H$.

A comparator 115 compares the outputs produced by detectors 113 and 114 to apply a mode identifying signal to output terminal 116. It is expected that the output signal produced by detector 113 will exceed that produced by detector 114 only when the FM luminance signal contains the frequency component $f_L$, that is, only when the FM luminance signal occupies its low band. Conversely, it is expected that the output signal produced by detector 114 will exceed that produced by detector 113 only when the FM luminance signal includes the frequency component $f_H$; and it is expected that this occurs only when the FM luminance signal occupies its high band. Thus, the mode identifying signal admits of a low or negative voltage when the signal $Y_{FM}$ is in its low band, and a high or positive voltage when the signal $Y_{FM}$ is in its high band.

For the application wherein the FM luminance signal $Y_{FM}$ is reproduced from a video tape, the low band mode by which that signal is recorded typically occupies the frequency band from 4.2 MHz to 5.4 MHz, and $f_L = 4.2$ MHz. For high band recording, the and $f_H = 5.7$ MHz. When the mode detecting circuits shown in FIGS. 1 and 2 are used, it may turn out that the lower side band of the FM luminance signal $Y_{FM}$ recorded in the high band mode nevertheless may be sufficiently close to the frequency $f_L$ as to be passed by band pass filter 101 or band pass filter 111. The possibility that this frequency in the lower side band component may be passed will result in an erroneous indication by the circuit of FIG. 1 that the FM luminance signal is recorded in its low band mode when, in actuality, it was recorded in its high band mode. A similar erroneous indication will be provided by the circuit shown un FIG. 2 if, at the time that the lower side band is passed by band pass filter 111, the upper side band includes no frequency components which can be passed by band pass filter 112. Also, in this circuit, it may turn out that, while the lower side band component is passed by band pass filter 111, the level of the carrier frequency then passed by band pass filter 112 is less than this lower side band component. As a result, comparator 115 erroneously produces a low or negative voltage indicating that the FM luminance signal $Y_{FM}$ was recorded in its low band mode.

Figure 3:
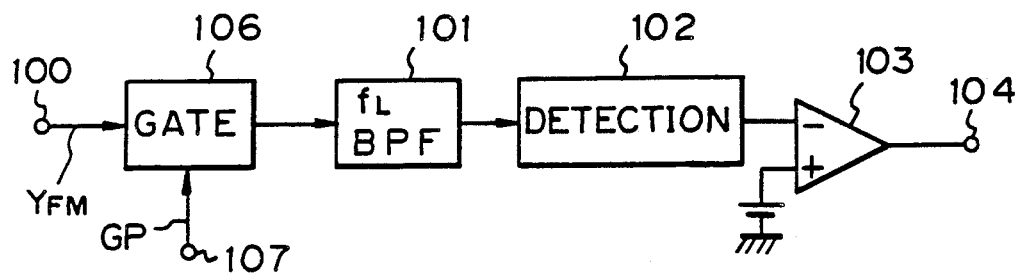
FIG. 3 is a block diagram of a further example of a previously proposed mode detecting circuit.

To avoid this erroneous detection, a modification of the circuit shown in FIG. 1 has been proposed; and this modification is shown in FIG. 3. It will be appreciated that a similar modification may be added to the example shown in FIG. 2.

In FIG. 3, a gate circuit 106 is supplied with a gate pulse GP which opens the gate circuit only during the interval that a horizontal synchronizing signal is expected in the FM luminance signal $Y_{FM}$. By using gate circuit 106, band pass filter 101 is supplied with a signal only at those times at which the sync tip frequency is expected. Lower side band components of the FM luminance signal recorded in the high band mode thus will not reach the band pass filter. However, the gate pulse GP is derived from the synchronizing signal demodulated from the FM luminance signal; and if the demodulator is not matched to the band in which the FM luminance signal had been recorded, such recovery of the synchronizing signal cannot be easily attained. Therefore, if the demodulator initially is adjusted so as to be matched to a high band mode of recording, but the actual FM luminance signal $Y_{FM}$ was recorded in the low band mode, the demodulator will not operate properly and, thus, the low band FM luminance signal will not be demodulated correctly. Thus, gate pulse GP will not be produced. As a consequence, comparator 103 will produce a mode identifying signal erroneously indicating that the reproduced FM luminance signal was recorded in the high band mode.

Figure 4A:
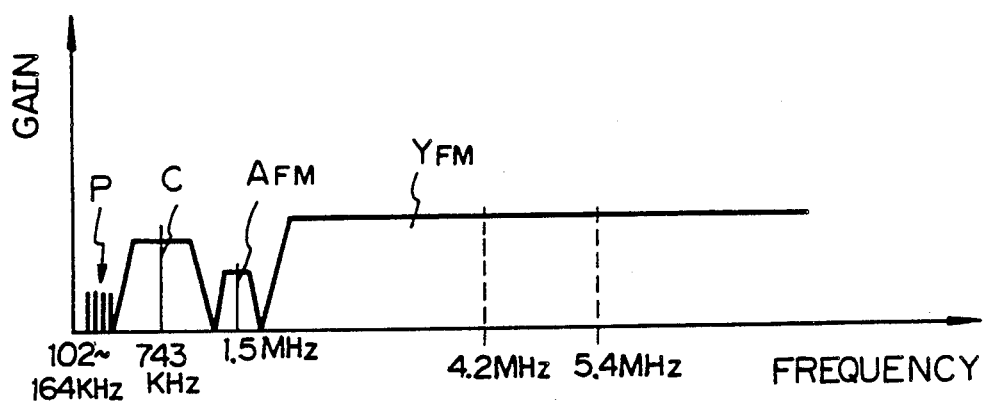
FIGS. 4A and 4B are frequency spectra diagrams representing the spectra used to record low and high frequency band FM luminance signals.
Figure 4B:
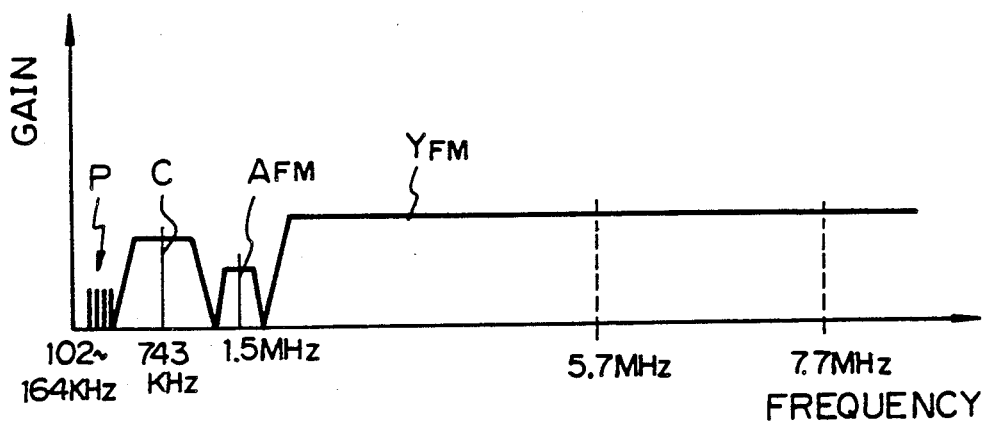

FIGS. 4A and 4B illustrate the frequency spectra of a recorded composite video signal. The luminance component is frequency modulated to occupy either a relatively low band (FIG. 4A) or a high band (FIG. 4B). The low band occupies the range of 4.2 MHz to 5.4 MHz, where 4.2 MHz represents the sync tip level and 5.4 MHz represents the white peak level of the video signal. When the FM luminance signal $Y_{FM}$ is recorded in its high band mode, 5.7 MHz represents the sync tip level and 7.7 MHz represents the white peak level.

In both the high band and low band recording modes, the chrominance signal C is recorded with a carrier frequency of 743 KHz and, thus, is frequency converted to a lower frequency range than it occupies in the conventional NTSC video signal. The audio signal associated with the video program is frequency modulated; and as shown in FIGS. 4A and 4B, the frequency modulated audio signal $A_{FM}$ exhibits a center frequency on the order of about 1.5 MHz. A pilot signal P also is recorded in the range 102 KHz to 164 KHz, and this pilot signal P is used for ATF tracking during signal reproducing operations.

A block diagram of the video signal reproducing apparatus provided in a typical VTR, such as an 8 mm VTR, is shown in FIG. 5. One or more rotatable magnetic pickup heads 2 are adapted to scan slant tracks across a moving magnetic tape 1 to reproduce the video signal previously recorded in those tracks. A reproduced composite video signal is supplied to a regenerative amplifier 3 whose characteristics are selectable so as to be matched to the high or low recording band which had been used to record the FM luminance signal $Y_{FM}$.

A signal separator comprised of band pass filter 4 and high pass filter 5 are coupled to the output of the playback circuit and are supplied with the reproduced composite video signal amplified by amplifier 3. Band pass filter 4 is adapted to separate the chrominance component from the composite video signal whose spectrum is shown in FIG. 4A or FIG. 4B; and the separated chrominance signal C is supplied to a chrominance signal processing circuit 6. The construction and operation of circuit 6 form no part of the present invention per se, and further description thereof is not provided herein. Suffice it to say that the chrominance signal is restored to its original frequency range and supplied to chrominance output 7.

High pass filter 5 separates the FM luminance signal $Y_{FM}$ from the composite video signal; and this separated luminance signal is applied to a luminance processing channel comprised of an adjustable FM demodulator 8, a deemphasis circuit 9 and a picture quality adjusting circuit 10. The separated FM luminance signal $Y_{FM}$ also is applied to a mode detector 12 for detecting whether the luminance signal had been recorded in the low band mode or in the high band mode. One embodiment of mode detector 12 is illustrated in FIG. 6 and will be described below. Suffice it to say for the present discussion that the mode detector produces a mode identifying signal indicative of the low or high band mode in which the FM luminance signal $Y_{FM}$ was recorded.

Advantageously, the mode identifying signal is supplied to amplifier 3, to adjustable FM demodulator 8, to deemphasis circuit 9 and to picture quality adjusting circuit 10 for use by these respective circuits to adjust the operating characteristics thereof so as to match the low or high band in which the FM luminance signal $Y_{FM}$ was recorded. For example, the operating characteristics of FM demodulator 8 are adjusted such that the demodulator operates to demodulate FM signals in the low band range of 4.2 MHz to 5.4 MHz, or to demodulate FM signals in the high band range of 5.7 MHz to 7.7 MHz. It is appreciated that the sensitivity of the demodulator thus can be shifted between low and high ranges, thus providing a more accurate recovery of the luminance signal. A broad-band demodulator capable of operating throughout both frequency ranges, that is, from 4.2 MHz to 7.7 MHz thus may not be needed.

Likewise, the mode identifying signal produced by mode detector 12 may match deemphasis circuit 9 to the particular frequency range in which the FM luminance signal $Y_{FM}$ was recorded. A similar matching of the operating characteristics of regenerative amplifier 3 and picture quality adjusting circuit 10 likewise are attained in response to the mode identifying signal. Consequently, an accurately reproduced luminance component is provided at luminance output 11, regardless of whether the reproduced FM luminance signal $Y_{FM}$ was recorded in the low band or high band.

A display 14 is provided to display the recording mode in which the FM luminance signal had been recorded. Display 14 responds to the mode identifying signal produced by mode detector 12, thereby providing an indication, such as a visual indication, of whether the FM luminance signal had been recorded in the low band or high band. A system controller 13 is coupled to display 14 and receives the mode identifying signal to drive the display. In one embodiment, system controller 13 is comprised of a conventional microprocessor and, as will be described below, functions to inhibit display 14 when an accurate mode identification cannot be made. For example, in the event that the apparatus shown in FIG. 5 is used with a blank magnetic tape (or a blank portion of tape 1), FM luminance signals are not reproduced and a decision cannot be made as to the frequency band occupied by the FM luminance signal. It is preferred, then, simply to inhibit the operation of display 14 rather than provide a possibly erroneous or ambiguous mode display.

Turning now to FIG. 6, there is illustrated one embodiment of the present invention. In this embodiment, first and second detecting circuits are provided to detect different frequency components normally included in the low and high frequency bands of the FM luminance signal $Y_{FM}$. The first detecting circuit is comprised of a band pass filter 23 tuned to the frequency $f_1$ which represents the sync tip level in one frequency band and a level detection circuit 25 coupled to filter 23. The other detecting circuit is comprised of a band pass filter 24 tuned to a different frequency and a level detection circuit 26 coupled thereto. The different frequency to which filter 24 is tuned is equal to $(2f_2-f_1)$, where $f_2$ is approximately equal to a predetermined frequency included in the other frequency band and $f_1$ is the sync tip frequency included in the aforementioned first frequency band. As a numerical example, $f_1$ is the frequency representing the sync tip level when the luminance signal $Y_{FM}$ is recorded in the low band mode and the frequency $f_2$ is representative of a predetermined level of the luminance signal when $Y_{FM}$ is recorded in the high band mode. This predetermined level is the approximate average level of video picture information and, in one embodiment, comprises the 50% white level. With reference to the frequency spectra illustrated in FIGS. 4A and 4B, as a numerical example, $f_1=4.2$ MHz and $f_2=7$ MHz.

In an alternative embodiment, band pass filter 23 may be tuned to the frequency representing the sync tip level when the FM luminance signal $Y_{FM}$ is recorded in the high band mode and when $Y_{FM}$ is recorded in the low band mode. As a numerical example of this alternative embodiment, $f_1=5.7$ MHz and $f_2$ may be in the range of 4.8 MHz to 5.0 MHz.

A limiter circuit 22 is coupled to an input terminal 21 to receive the FM luminance signal $Y_{FM}$, remove amplitude variations therein and supply an amplitude-limited frequency modulated signal in common to band pass filters 23 and 24. A signal sensor is coupled to the output of level detection circuits 25 and 26 and supplies a mode identifying signal to an output terminal 29. The signal sensor is comprised of a comparator 27 having, in one embodiment, an inverting input coupled to level detection circuit 25 and a non-inverting input coupled to receive an output signal derived from level detection circuit 26. For a purpose to be described below, a level adjusting circuit is provided to adjust the level of the output signal produced by level detection circuit 26 relative to that of the output signal produced by level detection circuit 25. This level adjusting circuit is comprised of a d.c. offset circuit which, in the illustrated embodiment, imparts a d.c. offset of positive level to the output signal produced by level detection circuit 26. This d.c. offset circuit is comprised of a source of d.c. voltage 30 and an adder 28 for adding this d.c. level to the output of level detection circuit 26. If desired, a d.c. offset circuit may be used to impart a negative d.c. level to the output of level detection circuit 25. As yet another embodiment, level detection circuits 25 and 26 both may be provided with d.c. bias voltages, one of which is greater than the other, thereby providing the aforementioned d.c. offset to the output signals produced thereby.

Figure 7:
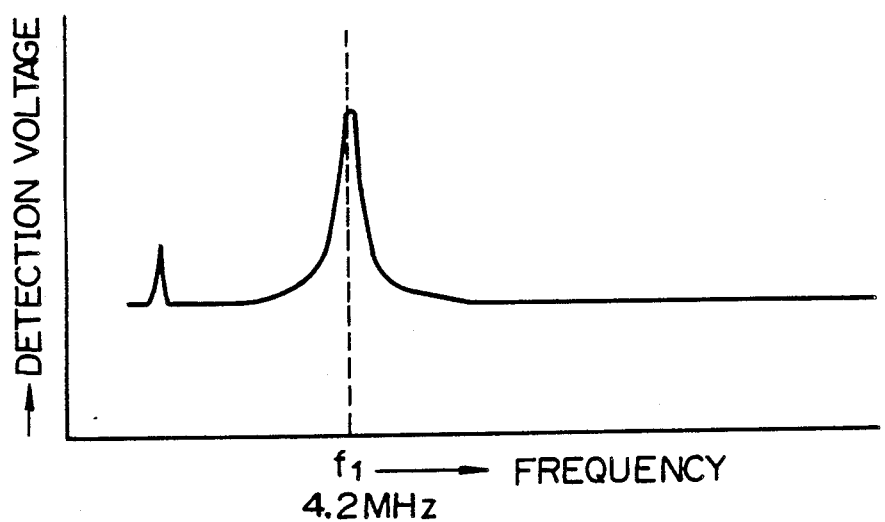
FIGS. 7 and 8 illustrate the frequency characteristics of the band pass filters used with the present invention.

Preferably, the filtering characteristics of band pass filter 23 exhibits a relatively narrow band such as illustrated by the frequency spectrum shown in FIG. 7. Although the center frequency of filter 23 has been described as equal to the frequency representing the sync tip level in the low (or alternatively, high) frequency band, this frequency may be approximately equal to that which represents the pedestal level in the low (or high) band. Filter 23 provides good sensitivity to the particular frequency component which it is adapted to detect.

Figure 8:
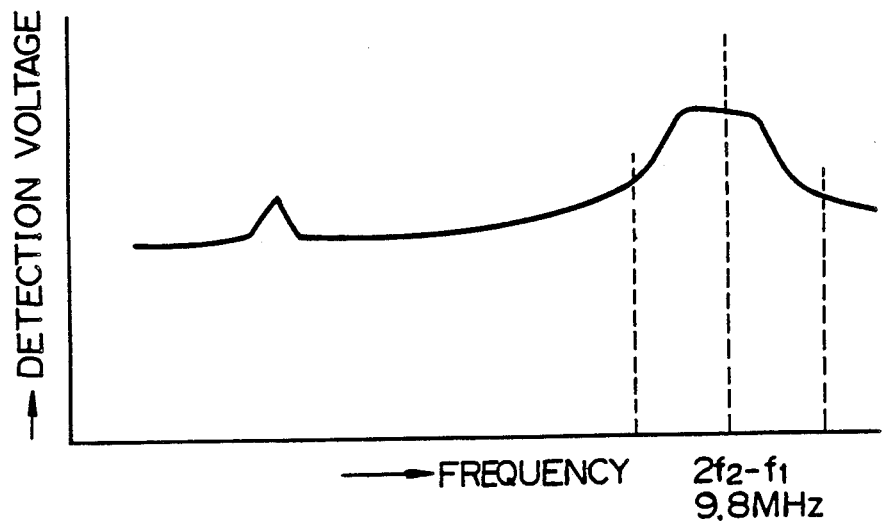

FIG. 8 illustrates the frequency characteristics of band pass filter 24. As shown, it is preferred that filter 24 exhibits a wide pass band relative to that of filter 23. For the example wherein it is assumed that the frequency $f_2$ is approximately equal to the frequency representing a 50% white level when the FM luminance signal $Y_{FM}$ is recorded in the high band mode, filter 24 is tuned to $(2f_2-f_1)=(2\times7-4.2)=9.8$ MHz.

Alternatively, if band pass filter 23, having the aforementioned narrow pass band, exhibits a center frequency of $f_1=5.7$ MHz (i.e. the frequency representing the sync tip level when the FM luminance signal is recorded in the high band mode), then band pass filter 24, having the wider pass band, is tuned to the frequency $(2\times4.8-5.7)=3.9$ MHz. For the purpose of the following discussion, it is assumed that band pass filter 23 is tuned to the sync tip frequency when $Y_{FM}$ is recorded in the low band mode and filter 24 is tuned to the frequency equal to the difference between twice the 50% white level frequency (when $Y_{FM}$ is recorded in the high band mode) and the low band sync tip frequency. That is, it is assumed, for one numerical example, that $f=4.2$ MHz, $f_2=7$ MHz and $(2f_2-f_1)=9.8$ MHz.

With the foregoing assumption, in operation, when the FM luminance signal $Y_{FM}$ is recorded in the low band mode, filter 23 passes a signal corresponding to the sync tip level and level detection circuit 25 produces an output signal when the passed signal exceeds a predetermined threshold level. Since the frequency spectrum of the FM luminance signal is substantially less than the pass band of filter 24 (shown in FIG. 8), this filter does not pass a signal to level detection circuit 26. Hence, when the FM luminance signal is recorded in the low band mode, level detection circuit 26 does not produce an output signal.

The d.c. offset added to the output signal produced by level detection circuit 26 is selected to be less than the level of the output signal produced by level detection circuit 25 when the low band sync tip frequency is detected. Accordingly, the level of the signal supplied to the inverting input of comparator 27 is greater than the level of the signal supplied to the non-inverting input thereof. Accordingly, a mode identifying signal $M_{DET}$ of low or negative voltage is produced by the comparator to indicate that the reproduced FM luminance signal $Y_{FM}$ had been recorded in its low band mode.

Conversely, if the FM luminance signal had been recorded in the high band mode, the low band sync tip frequency is not present and, thus, filter 23 does not pass a signal to level detection circuit 25; but the d.c. offset added to the output of level detection circuit 26 is such that comparator 27 produces a positive, or high voltage level, whereby the mode identifying signal $M_{DET}$ indicates that signal $Y_{FM}$ was recorded in the high band mode.

Assuming that the input signal $Y_{FM}$ was recorded in the high band mode, it may turn out that the lower side band component of that modulated signal includes a frequency equal or close to the sync tip frequency $f_1$. As a result, this frequency included in the lower side band component may be passed by filter 23 to level detection circuit 25, resulting in an output signal applied thereby to comparator 27. But, the center frequency and pass band width of filter 24 is such that, at this time, the upper side band component of signal $Y_{FM}$ includes a frequency component within the pass band of filter 24. Accordingly, this frequency component is passed and detected by level detection circuit 26. By reason of the d.c. offset added thereto, the output signal produced by level detection circuit 26 is adjusted so as to exceed the level of the output signal produced by level detection circuit 25. Consequently, comparator 27 produces a positive, or higher, voltage level identifying signal indicating that the reproduced FM luminance signal had been recorded in the higher frequency band.

Figure 9:
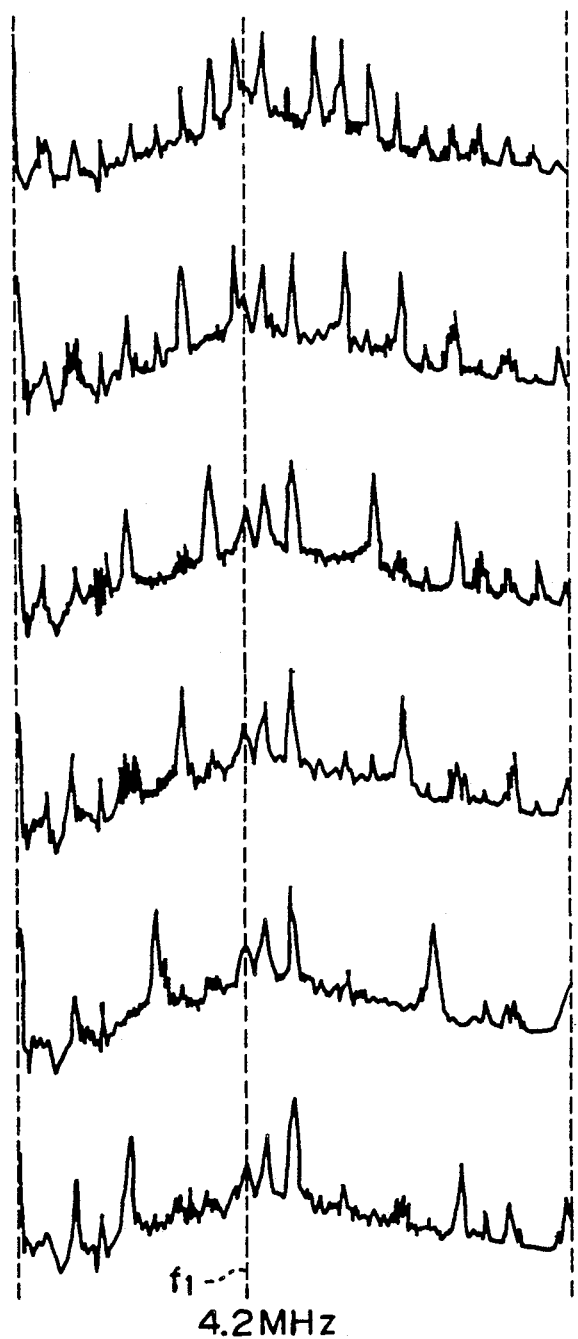
FIGS. 9A-9F and 10A-10F illustrate frequency spectra of carriers that are frequency modulated with signals of different frequencies and are useful in understanding the present invention.
Figure 10:
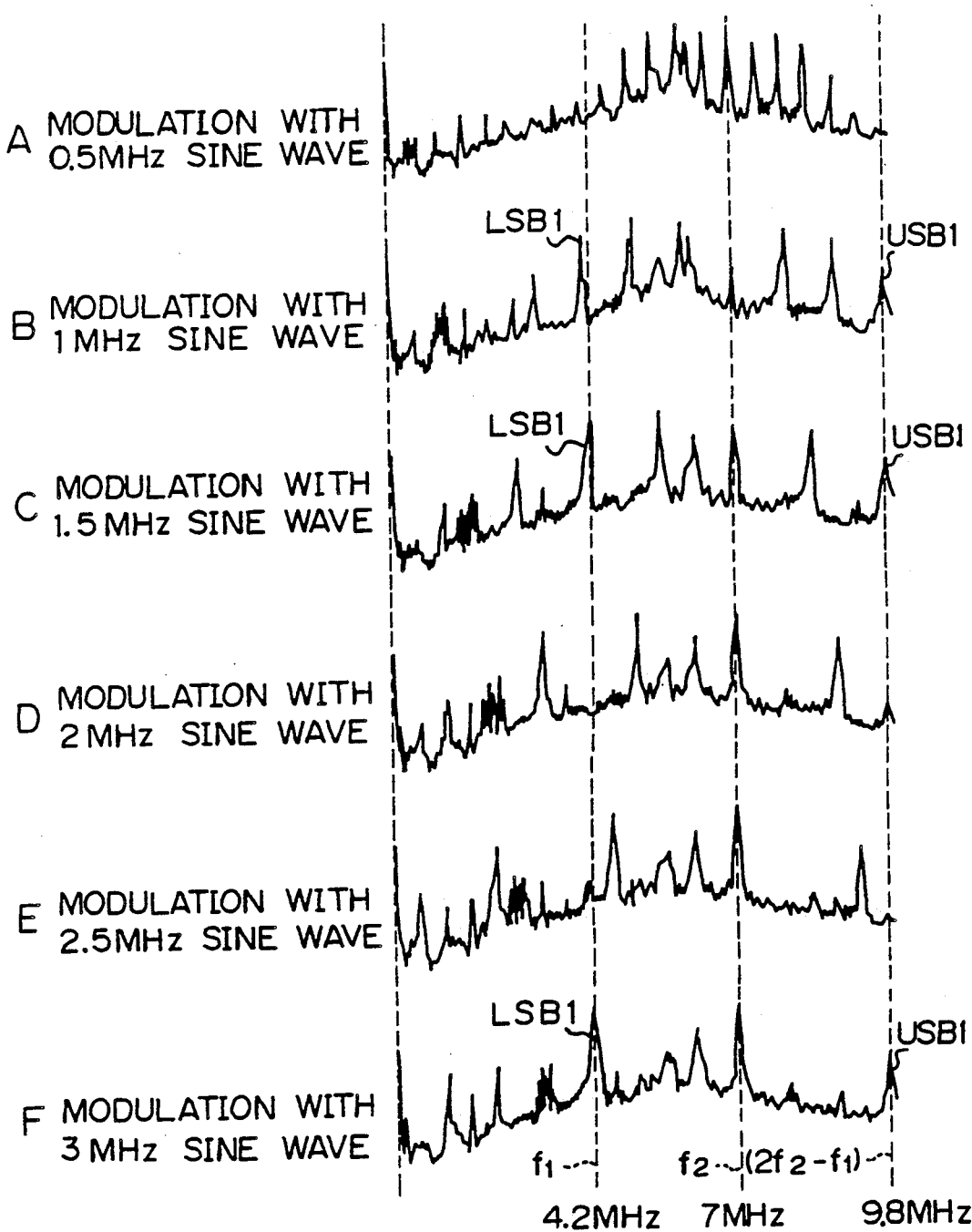

A comparison of the side bands present when the FM luminance signal is recorded in low and high frequency bands now will be described with reference to FIGS. 9 and 10. FIGS. 9A–9F illustrate the frequency spectra produced when the carrier of the FM luminance signal is modulated in the lower frequency band by a sine wave of 0.5 MHz, 1 MHz, 1.5 MHz, 2 MHz, 2.5 MHz and 3 MHz, respectively. FIGS. 9A–9F also illustrate the presence of the 4.2 MHz sync tip frequency component. It will be seen that, notwithstanding the modulation of the low band carrier frequency with the sine wave component, a detectable sync tip frequency of 4.2 MHz is present. Thus, the sync tip frequency component is passed by filter 23, detected by level detection circuit 25 and used by comparator 27 to indicate the low band mode.

FIGS. 10A–10F illustrate the spectra of the carrier frequency in the high frequency band that is frequency modulated with a sine wave of 0.5 MHz, 1 MHz, 1.5 MHz, 2 MHz, 2.5 MHz and 3 MHz, respectively. Notwithstanding the fact that the carrier frequency of the high frequency band is separated substantially from the 4.2 MHz frequency to which filter 23 is tuned, it is seen that, in some instances, the lower side band component of the frequency modulated carrier contains a frequency component equal or close to this 4.2 MHz frequency. More particularly, when the carrier frequency is frequency modulated with a sine wave of 1 MHz, 1.5 MHz or 3 MHz, the lower side band component of the frequency modulated signal includes a frequency component equal or close to the center frequency $f_1$ of filter 23. Such lower side band component is identified as component LSB1 in the frequency spectra.

It also will be observed that, for the sine wave frequencies which produce the lower side band component LSB1, an upper side band component USB1 also is produced. This upper side band component includes a frequency component equal or close to the center frequency $(2f_2-f_1=9.8$ MHz$)$ of filter 24. Thus, although filter 23 may pass the lower side band component LSB1 when the carrier frequency of the high band signal $Y_{FM}$ is modulated with certain information frequencies, filter 24 concurrently will pass the upper side band component USB1 when the carrier frequency is modulated with those same information frequencies.

From the foregoing, it is appreciated that, although the lower side band component of the high band FM luminance signal may be passed by filter 23 for some information frequencies, those same information frequencies will result in an upper side band component that is passed concurrently by filter 24. Hence, level detection circuits 25 and 26 both will produce output signals for the modulation of the high band FM carrier by these information frequencies. Whereas this phenomenon would result in an erroneous indication by the detector circuits shown in FIGS. 1 and 2, the embodiment shown in FIG. 6 will indicate correctly that the FM luminance signal had been recorded in its high band mode. This is because the d.c. offset level added to the output signal produced by level detection circuit 26 results in a level adjusted signal that exceeds the output signal produced by level detection circuit 25. Comparator 27 thus produces a positive, or high voltage output signal $M_{DET}$ indicating that the FM luminance signal had been recorded in its high band mode.

The center frequencies of filters 23 and 24 are selected such that not only is the sync tip frequency passed by filter 23, but the only side band component of the high band FM luminance signal which is also passed by this filter is accompanied by the other side band component of that FM signal. That is, filters 23 and 24 are selected to pass symmetrical upper and lower side bands centered about the high band carrier for FM luminance signal $Y_{FM}$. As shown in FIG. 11, assuming the carrier frequency of the high band signal $Y_{FM}$ to be $f_2$ (i.e. assuming the carrier frequency to represent the average level of video picture information), then lower side band component $f_2-a$ is accompanied by an upper side band component $f_2+a$, lower side band component $f_2-2a$ is accompanied by upper side band component $f_2+2a$, lower side band component $f_2-3a$ is accompanied by upper side band component $f_2+3a$, and so on. Thus, when one of these lower side band components is of a frequency sufficient to be passed by filter 23, its symmetrical upper side band component concurrently is passed by filter 24. Therefore, output signals of approximately the same magnitude are produced by level detection circuits 25 and 26; and the d.c. offset added to the output of level detection circuit 26 results in a mode identifying signal $M_{DET}$ indicating that the FM luminance signal had been recorded in its high band mode.

The converse of the aforedescribed operation does not occur. That is, assuming that the FM luminance signal had been recorded in its low band mode, a frequency component included therein that is passed by filter 23 (i.e. the sync tip frequency) is not accompanied by an upper side band component having a frequency that is passed by filter 24.

In an alternative embodiment of the circuit shown in FIG. 6, the center frequency of filter 23 is equal to the sync tip frequency 5.7 MHz of the high band mode; and the center frequency of filter 24 is equal to $(2 \times 4.8 - 5.7) = 3.9$ MHz. Now, when the FM luminance signal is recorded in its high band mode, the sync tip frequency component is passed by filter 23 while filter 24 passes no frequency components. Thus, the output signal supplied to comparator 27 by level detection circuit 25 exceeds the level adjusted output signal supplied to the comparator by level detection circuit 26 and d.c. offset circuit 28. In this embodiment, comparator 27 produces a negative or low voltage indicating that the signal $Y_{FM}$ had been recorded in the high band.

When the FM luminance signal is recorded in the low band, a lower side band component may include an information frequency that is passed by filter 24. Concurrently, this modulation of the low band carrier may result in an upper side band component having a frequency passed by filter 23. The signal levels of the output signals produced by level detection circuits 25 and 26 may be approximately equal to each other; but the d.c. offset added to the output signal from level detection circuit 26 results in comparator 27 producing a mode identifying signal indicating that the reproduced FM luminance signal had been recorded in its low band mode.

From the foregoing description, it is recognized that four combinations of output signals may be produced by level detection circuits 25 and 26:

A. An output signal is produced concurrently by both level detection circuit 25 and 26.

B. An output signal is produced by level detection circuit 25 concurrently with no output signal produced by level detection circuit 26.

C. An output signal is produced by level detection circuit 26 concurrently with no output signal produced by level detection circuit 25.

D. No output signal is produced by both level detection circuits 25 and 26.

A. Let it be assumed that output signals are produced concurrently by level detection circuits 25 and 26. This can occur only if a frequency included in the lower side band component of the FM luminance signal is passed by filter 23 while an upper side band component of the FM luminance signal is passed by filter 24. Thus, comparator 27 produces the mode identifying signal $M_{DET}$ indicating that the FM luminance signal had been recorded in its high band mode.

B. Level detection circuit 25 can produce an output signal in the absence of an output signal produced by level detection circuit 26 only if the FM luminance signal contains a frequency that passes through filter 23 only. This condition is satisfied only when the FM luminance signal is recorded in the low band mode so as to contain the sync tip frequency. Thus, comparator 27 produces the mode identifying signal $M_{DET}$ indicating that the signal $Y_{FM}$ had been recorded in its low band mode.

C. The actual occurrence of an output signal from level detection circuit 26 in the absence of an output signal from level detection circuit 25 may occur rarely, if at all. It is recalled from FIGS. 10B, 10C and 10F, an upper side band component passed by filter 24 when the FM luminance signal is recorded in its high band mode is accompanied by a lower side band component passed by filter 23. However, even though these symmetrical side bands may be present, the influence of noise and the differences in the filtering characteristics of filters 23 and 24 may sufficiently attenuate the signal passed by filter 23 such that level detection circuit 25 produces an output signal of very low, or negligible, level. In this case, then, comparator 27 is provided with a signal at is non-inverting input which exceeds the signal provided at its inverting input, thereby producing the mode identifying signal $M_{DET}$ indicating that the signal $Y_{FM}$ had been recorded in its high band mode.

D. The absence of output signals from level detection circuits 25 and 26 generally will occur if the lower and upper side band components of the FM luminance signal are outside the pass bands of both filter 23 and filter 24. Since the signal $Y_{FM}$ will include the sync tip frequency passed by filter 23 if the FM luminance signal had been recorded in its low band mode, the condition that neither filter passes signals is satisfied if the FM luminance signal is recorded in its high band mode. Accordingly, for this case, the d.c. offset added to the output of level detection circuit 26 results in a signal of higher level applied to the non-inverting input of comparator 27 than is supplied to the inverting input thereof. Therefore, the comparator produces the mode identifying signal $M_{DET}$ indicating that the FM luminance signal had been recorded in its high band mode.

From the foregoing, it is appreciated that the signal sensor coupled to the outputs of level detection circuits 25 and 26 produces a mode identifying signal indicating that the FM luminance signal had been recorded in its low band mode only if an output signal is produced by level detection circuit 25 concurrently with the absence of an output signal produced by level detection circuit 26. At all other times, comparator 27 produces a mode identifying signal indicating that the FM luminance signal is recorded in its high band mode.

The foregoing discussion has assumed that the center frequency of filter 23 corresponds to the sync tip frequency when the FM luminance signal is recorded in its low band mode. It will be appreciated by those of ordinary skill in the art that an analogous operation will be carried out if the center frequency of filter 23 corresponds to the sync tip frequency of the FM luminance signal recorded in the high band mode. In this alternative embodiment, the mode identifying signal $M_{DET}$ indicates that the signal $Y_{FM}$ had been recorded in its high band mode when an output signal is produced by level detection circuit 25 concurrently with the absence of an output signal produced by level detection circuit 26. For all other conditions of the level detection circuit output signals, the mode identifying signal $M_{DET}$ indicates that the FM luminance signal had been recorded in the low band mode.

In using the video signal playback apparatus shown in FIG. 5 with mode detector 12 (shown in FIG. 6), a portion (or, possibly, all) of video tape 1 may be "blank". That is, as the video tape is advanced, no signals may be reproduced therefrom because no signals had been recorded. In the absence of a reproduced FM luminance signal, no signals are passed by filters 23 and 24 and, thus, no (or low level) output signals are produced by level detection circuits 25 and 26. From the foregoing discussion, it is recalled that comparator 27 produces a positive, or high voltage mode identifying signal $M_{DET}$ when no output signals are produced by the level detection circuits. Thus, in the absence of reproduced video signals, mode detector 12 may provide an erroneous indication that, not only is an FM luminance signal present but it was recorded in the high band mode.

It is preferred that this possibly erroneous indication not be displayed on display 14. Although an incorrect display will not affect the proper operation of, for example, regenerative amplifier 3, FM demodulator 8, deemphasis circuit 9 or picture quality adjusting circuit 10, it is preferred not to provide the user with an erroneous mode detection indication when, in fact, an FM luminance signal is not recovered from tape 1. It is, of course, appreciated that, even if the circuits included in the luminance signal recovery channel of the reproducing apparatus shown in FIG. 5 are set, initially, to be compatible with, for example, the high frequency band, upon subsequent detection that the reproduced FM luminance signal is, in fact, recorded in the low band mode, the operating characteristics of those circuits will be changed over promptly so as to be matched to that low band mode.

FIG. 12 is a block diagram of another embodiment of the present invention comprised of mode detector 12, substantially identical to the mode detector shown in FIG. 6, supplemented with a display inhibit circuit adapted to inhibit system controller 13 from driving display 14 with the mode identifying signal in the event that FM luminance signal $Y_{FM}$ is not reproduced from tape 1. This display inhibit circuit is comprised of a level detector 81 coupled to input terminal 21 to receive and detect the level of the signal $Y_{FM}$. The detected signal level is compared to a d.c. reference level by a comparator 82. If the detected signal level of the FM luminance signal is less than the d.c. reference level, comparator 82 supplies an inhibit signal to system controller 13, thereby inhibiting display 14 from displaying an incorrect indication of the mode in which signal $Y_{FM}$ was recorded. Conversely, comparator 82 enables the system controller to drive display 14 with the mode identifying signal when the detected level of the FM luminance signal exceeds this reference level.

As an alternative, system controller 13 may respond to a low or negative voltage produced by comparator 82 when the detected level of signal $Y_{FM}$ is less than the reference level so as to provide a display indicating that the luminance signal recording mode cannot be properly determined. Such a display may be an alphanumeric display, or a suitable, predetermined visual indicator may be energized to provide this indication.

Turning now to FIG. 13, one example of the construction of mode detector 12 now will be described in conjunction with a schematic diagram thereof. For convenience, the individual circuits shown in block diagram form in FIG. 6 are identified in the schematic diagram of FIG. 13.

Limiter 22 includes transistors 31 and 32 whose emitters are connected by an RC circuit formed of resistor 33 in parallel with resistor 34. The base of transistor 31 is adapted to receive the reproduced luminance signal $Y_{FM}$ and is biased by the voltage divider formed of resistors 39 and 40 connected in series between a source of operating potential 38 and ground 37. Similarly, bias resistors 41 and 42 are connected in series across power supply terminals 38 and 37 to apply a bias voltage to the base of transistor 32. A bias capacitor 43 also is connected to the base of this transistor. The signal output of transistor 32 is derived from its collector which is coupled to an emitter-follower transistor 45 the output of which provides an amplitude-limited FM luminance signal.

A capacitor 46 connected in series with parallel, oppositely poled limiting diodes 47 and 48 is connected to the base of transistor 45.

Band pass filter 23 includes a PNP transistor 51 whose base is coupled to the output of limiter 22. The band pass filter includes an LC circuit formed of parallel-connected inductance 54 and capacitance 55, the LC circuit being coupled to the collector of transistor 51. The output of this LC circuit is derived from the collector of transistor 51 and is capacitively coupled by way of a capacitor 56 to level detection circuit 25.

Band pass filter 24 is of similar construction to band pass filter 23 and includes a PNP transistor 52 whose base is coupled to the output of limiter 22. An LC circuit formed of parallel-connected inductance 59 and capacitance 60 is coupled to the collector of transistor 42. The output of band pass filter 24 is derived from the collector of transistor 52 and is capacitively coupled by a capacitor 61 to level detection circuit 26.

Level detection circuit 25 includes an emitter-follower transistor 57 whose base is biased to a d.c. level DCA by the voltage divider or bias circuit formed of resistors 63 and 64 connected in series across the power supply terminals. It is recognized that transistor 57 is rendered conductive if the signal supplied to its base exceeds its base-emitter bias voltage. A smoothing capacitor 66 is connected in parallel with emitter resistor 65.

Level detection circuit 26 is similarly constructed and includes an emitter-follower resistor 62 whose base is supplied with a d.c. bias voltage DCB produced by the voltage divider bias circuit formed of resistors 67 and 68 connected in series across the power supply terminals. Here too, transistor 62 is rendered conductive when the voltage supplied to its base exceeds its base-emitter bias voltage. A smoothing capacitor 70 is connected in parallel with emitter resistor 69.

Preferably, the d.c. levels DCA and DCB are not equal. This inequality provides a d.c. offset to the outputs of level detection circuits 25 and 26. In the preferred embodiment described herein, d.c. level DCB exceeds d.c. level DCA such that the difference therebetween (DCB−DCA) constitutes the aforementioned d.c. offset effectively added to the output signal produced by level detection circuit 26. Thus, in the schematic diagram shown in FIG. 13, (DCB−DCA) may be thought of as constituting d.c. voltage source 30 of FIG. 6.

Comparator 27 is comprised of differentially connected PNP transistors 71 and 72. It is seen that the emitters of these transistors are connected in common via a resistor 73 to power supply terminal 38. The base of transistor 71 is coupled to the emitter of transistor 57, thus receiving the output signal produced by level detection circuit 25. Similarly, the base of transistor 72 is coupled to the emitter of transistor 62 thus receiving the output signal produced by level detection circuit 26. The output of comparator 27 is derived from the collector of transistor 72 and is a function of the difference between the signals supplied to the bases of transistors 71 and 72, respectively. A simple transistor amplifier comprised of transistor 75 is coupled to the output of comparator 27, that is, to the collector of transistor 72, and the mode detector output is derived from the collector of this transistor 75.

Since the operation of mode detector 12 has been discussed in detail hereinabove in conjunction with FIG. 6, further discussion of such operation, which may be merely duplicative, is not necessary for a satisfactory understanding and appreciation of the present invention. It is recognized that d.c. bias voltages DCA and DCB are superimposed onto the bases of transistors 57 and 62 of level detection circuits 25 and 26, respectively. As mentioned above, these d.c. levels result in the d.c. offset applied to the level detection circuits and contribute to the threshold levels associated with the level detection circuits. Assuming that the LC circuit of filter 23 is tuned to the sync tip frequency when signal $Y_{FM}$ is recorded in the low band mode ($f_1=4.2$ MHz) and assuming that the LC circuit of filter 24 is t tuned to the frequency ($2f_2-f_1=7$ MHz), if the FM luminance signal is recorded in the low band mode, the magnitude of the signal passed by filter 23 exceeds that of the signal passed by filter 24. Accordingly, even with the d.c. offset (DCB—DCA) provided across the bases of transistors 57 and 62, the magnitude of the voltage applied to the base of transistor 71 exceeds the magnitude of the voltage applied to the base of transistor 72. Consequently, transistor 72 is rendered conductive to apply a voltage sufficient to turn on transistor 75. Hence, a relatively low voltage is produced at output 77, thereby indicating that signal $Y_{FM}$ is recorded in the low band mode.

If the outputs of filters 23 and 24 are of approximately the same magnitude, as would occur when the lower side band component of the FM luminance signal recorded in the high band mode is accompanied by an upper side band component thereof, these respective side band components may be passed by filters 23 and 24. The fact that d.c. level DCB is greater than d.c. level DCA means that the emitter voltage at transistor 62 exceeds the emitter voltage at transistor 57. Hence, transistor 71 is rendered conductive, transistor 72 is turned off, and a relatively low voltage is applied to the base of transistor 75. Transistor 75 thus does not conduct and a relatively high voltage is produced at output 77 to indicate that the FM luminance signal had been recorded in the high band mode.

It is appreciated that the foregoing operation is applicable to the condition wherein signals are not passed by both filter 23 and filter 24, thus resulting in substantially zero signals supplied from these filters to transistors 57 and 62, respectively. Once again, since d.c. level DCB exceeds d.c. level DCA, the voltage supplied from transistor 62 to the base of transistor 72 exceeds the voltage supplied from the emitter of transistor 57 to the base of transistor 71. Thus, as before, transistor 72 is rendered non-conductive to turn off transistor 75, resulting in a relatively high voltage at output 77.

Of course, if a frequency component is passed by filter 24 while no signal is passed by filter 23, the emitter voltage of transistor 62 exceeds the emitter voltage of transistor 57, thus rendering transistor 72 non-conductive to turn off transistor 75 and produce a relatively high voltage at output voltage 77. Accordingly, mode detector 12 indicates that the input FM luminance signal was recorded in the high band mode.

While the present invention has been particularly shown and described with reference to preferred embodiments, it will be readily appreciated by those of ordinary skill in the art that various changes and modifications may be made without departing from the spirit and scope of the invention. For example, the numerical examples discussed above are intended to be simply illustrative and are not to be construed as limiting the present invention solely to those numerical examples. The present invention is equally applicable to a low band frequency range from 4.4 MHz to 5.6 MHz, where the sync tip level is represented by an FM luminance signal of 4.4 MHz and the white peak level of a video signal is represented by the FM luminance component of 5.6 MHz. This frequency range is used for low band recording in the ½ inch VTR format which also may be operated in the high band mode of recording wherein the FM luminance signal ranges from 6.8 MHz to 8.6 MHz. Other frequency ranges typically used in other VTR formats also may be accommodated by the present invention, such as the low band frequency range of 3.4 MHz to 4.4 MHz and the high band frequency range of 5.4 MHz to 7.0 MHz. In all of these formats, proper detection of the high band recording mode is achieved even if a lower side band component thereof is passed by filter 23 because an accompanying upper side band component is passed concurrently by filter 24.

Also, the present invention can be used to detect the high band/low band mode occupied by an FM signal other than an FM luminance signal. If the FM signal contains particular frequency components representing predetermined information, the detection of such frequency components is used to indicate the band occupied by the FM signal.

It is intended that the appended claims be interpreted as covering the specific embodiments described herein, the alternative examples discussed above and all other equivalents thereto.

What is claimed is:

1. Apparatus for detecting whether a reproduced FM signal was recorded in a first mode or a second mode, the first and second modes having different frequency bands with respectively different carrier frequencies, and the FM signal containing particular frequency components in the respective frequency bands to represent predetermined information, said apparatus comprising:

first detecting means for producing a first output signal when the particular frequency component in one of said frequency bands is detected;

second detecting means for producing a second output signal when a different frequency component approximately equal to the difference between twice a predetermined frequency included in the other of said frequency bands and the particular frequency in said one frequency band is detected;

input means for supplying the reproduced FM signal to said first and second detecting means; and signal sensing means coupled to said first and second detecting means and responsive to said first and second output signals for producing a mode identifying signal indicative of the mode in which the reproduced FM signal was recorded.

2. The apparatus of claim 1 wherein the reproduced FM signal is a video signal.

3. The apparatus of claim 2 wherein the predetermined information represented by particular frequency components comprises a synchronizing signal whose amplitude is represented by a first particular frequency in said one frequency band and a second particular frequency in said other frequency band.

4. The apparatus of claim 2 wherein said predetermined frequency included in the other of said frequency bands is representative of a predetermined level of said video signal.

5. The apparatus of claim 4 wherein said predetermined level comprises an approximate average level of video picture information.

6. The apparatus of claim 5 wherein said approximate average level of video picture information comprises a 50% white level.

7. The apparatus of claim 2 wherein said first and second detecting means include first and second band pass filter means, respectively, each tuned to a different center frequency.

8. The apparatus of claim 7 wherein the first band pass filter means is tuned to a frequency $f_1$ approximately equal to the frequency representing a synchronizing signal amplitude level in said one frequency band; and the second band pass filter means is tuned to a frequency $(2f_2-f_1)$, where $f_2$ is equal to the frequency representing an approximately average level of video picture information in said other frequency band.

9. The apparatus of claim 8 wherein said one frequency band is lower than said other frequency band; and wherein a lower side band component included in said other frequency band that may be passed by said first band pass filter means is accompanied by an upper side band component passed by said second band pass filter means.

10. The apparatus of claim 8 wherein said one frequency band is higher than said other frequency band; and wherein a lower side band component included in said other frequency band that may be passed by said second band pass filter means is accompanied by an upper side band component passed by said one band pass filter means.

11. The apparatus of claim 8 wherein each of said first and second detecting means further includes a signal level detector coupled to the respective band pass filter means to produce an output signal if the signal passed by the band pass filter means is at least equal to a predetermined level; and wherein said signal sensing means comprises level adjusting means for increasing the level of the output signal produced by one of said signal level detectors relative to the level of the output signal produced by the other signal level detector, and comparator means for comparing the level adjusted output signals to produce said mode identifying signal.

12. The apparatus of claim 11 wherein said level adjusting means comprises d.c. offset means for providing a d.c. offset to the output signal produced by one of said level detectors.

13. The apparatus of claim 12 wherein said d.c. offset is a positive value and is added to the output signal produced by the level detector coupled to said second band pass filter means.

14. The apparatus of claim 13 wherein said comparator means produces a mode identifying signal representing that the FM video signal was recorded in said second mode when the level adjusted output signal supplied from the level detector coupled to said second band pass filter means exceeds the output signal supplied from the level detector coupled to said first band pass filter means.

15. The apparatus of claim 1 further comprising display means coupled to said signal sensing means and responsive to said mode identifying signal to display an indication of the mode in which the reproduced FM signal was recorded.

16. The apparatus of claim 15 further comprising inhibit means for inhibiting the display means from displaying a mode indication in the absence of an FM signal at said input means.

17. Video signal reproducing apparatus for recovering a luminance signal that is frequency modulated in either a first mode or a second mode, the first and second modes having different frequency bands with respectively different carrier frequencies, comprising:
playback means for playing back a composite video signal including chrominance and FM luminance signals from a record medium;
separating means coupled to said playback means for separating the composite video signal into a chrominance signal and an FM luminance signal;
chrominance processing means for receiving and processing the separated chrominance signal;
adjustable FM demodulating means for receiving and demodulating the separated FM luminance signal;
de-emphasis means coupled to said FM demodulation means for de-emphasizing the demodulated luminance signal; and
mode detecting means for detecting whether the FM luminance signal was recorded in the first or second mode, said mode detecting means comprising:
first detecting means for producing a first output signal when a particular frequency component normally provided in one of said frequency bands is detected in the FM luminance signal;
second detecting means for producing a second output signal when a different frequency component approximately equal to the difference between twice a predetermined frequency normally included in the other of said frequency bands and the particular frequency in said one frequency band is detected in the FM luminance signal;
means for supplying the FM luminance signal to said first and second detecting means;
signal sensing means coupled to said first and second detecting means and responsive to said first and second output signals for producing a mode identifying signal indicative of the mode in which the luminance signal was frequency modulated; and
means for applying said mode identifying signal to said FM demodulating means to adjust the operation thereof in accordance with the frequency band occupied by the FM luminance signal.

18. The apparatus of claim 17 wherein said mode detecting means further comprises means for applying said mode identifying signal to said de-emphasis means to adjust the operation thereof in accordance with the frequency band occupied by the FM luminance signal.

19. The apparatus of claim 17 wherein said mode detecting means further comprises display means coupled to said signal sensing means for displaying the mode in which the FM luminance signal was recorded as indicated by said mode identifying signal.

20. The apparatus of claim 17 wherein said first and second detecting means include first and second filter means, respectively, tuned to first and second different frequencies, such that a frequency component included in one of the lower or upper side bands of said other frequency band that may be passed by said first filter means is accompanied by a frequency component included in the other side band and is passed by said second filter means.

21. The apparatus of claim 20 wherein said signal sensing means comprises means responsive to the presence of a first output signal from said first filter means concurrently with the absence of a second output signal from said second filter means to indicate that said FM luminance signal was recorded in said one frequency band; and means responsive to the presence of a second output signal from said second filter means regardless of whether a first output signal from said first filter means also is present, to indicate that said FM luminance signal was recorded in said other frequency band.

22. The apparatus of claim 20 wherein said FM luminance signal component contains synchronizing signal information; wherein the first frequency to which said first filter means is tuned is approximately equal to the frequency component in the FM luminance signal representing the amplitude of the synchronizing signal when said FM luminance signal is recorded in said one frequency band; and wherein the second frequency to which said second filter means is tuned is approximately equal to the difference between twice the frequency component in the FM luminance signal representing an average level of video picture information when said FM luminance signal is recorded in said other frequency band and said first frequency.

23. A method of detecting whether an input FM signal, which includes predetermined information, occupies a first frequency band or a second frequency band, said predetermined information being represented by respective particular frequency components in the first and second frequency bands, comprising the steps of:

detecting in said FM signal the particular frequency component in said first frequency band to produce a first output signal;

detecting in said FM signal a different frequency component approximately equal to the difference between twice a predetermined frequency included in the second frequency band and the particular frequency component in said first frequency band to produce a second output signal; and producing a frequency band indicating signal in response to the combination of said first and second output signals.

24. The method of claim 23 wherein said step of producing a frequency band indicating signal comprises producing a first band indicating signal when said first output signal is produced concurrently in the absence of said second output signal, and producing a second band indicating signal when said second output signal is produced regardless of whether said first output signal also is present.

25. The method of claim 24 wherein said first frequency band is lower than said second frequency band; and wherein a lower side band component included in said second frequency band that may be detected as a particular frequency component in said first frequency band is accompanied by an upper side band component detected as the different frequency component.

26. The method of claim 24 wherein said first frequency band is higher than said second frequency band; and wherein a lower side band component included in said second frequency band that may be detected as the different frequency component is accompanied by an upper side band component detected as a particular frequency component in said first frequency band.

27. The method of claim 24 wherein the step of producing a frequency band indicating signal further comprises level adjusting the first and second output signals by increasing the level of one of said first and second output signals relative to the other, and comparing the level adjusted output signals to produce said band indicating signal.

28. The method of claim 27 wherein the step of level adjusting comprises adding a d.c. offset of positive value to the second output signal.

29. The method of claim 28 wherein the second band indicating signal is produced to indicate that the FM signal occupies the second frequency band when the level adjusted second output signal exceeds the first output signal.

* * * * *